Patented Sept. 13, 1949

2,482,006

UNITED STATES PATENT OFFICE 2,482,006

PROCESS FOR PREPARING CADMIUM SULFOSELENIDE PIGMENTS

Francois Kertesz, Staten Island, N. Y., assignor to E. I. du Pont de Nemours & Company, Wilmington, Del., a corporation of Delaware No Drawing. Application October 25, 1946, Serial No. 705,814

1 Claim. (Cl. 106—301)

This invention relates to greatly improved cadmium sulfoselenide pigments and to the method of obtaining the same.

Cadmium sulfoselenide pigments are commonly used in the production of red-colored glasses which may range in color from orange to maroon. These pigments are usually produced by mixing cadmium sulfide, cadmium oxide and selenium in finely divided form, and calcining the mixture at a temperature of about 580° C. to 680° C. The finely powdered components may, for example, be intimately admixed with each other in a clay crucible and heated in a muffle furnace. When the blue flame which burns at the mouth of the crucible is nearly extinguished, the crucible is removed from the furnace and the product cooled. It is believed that the resulting calcined pigment is a mixture of cadmium sulfide and cadmium selenide and that the ratio of cadmium sulfide to cadmium selenide present in the product determines the color and hue of the pigment. It appears that as the cadmium sulfide/cadmium selenide quotient decreases, the color changes from orange to red and maroon.

Heretofore, in the production of cadmium sulfoselenide pigments, considerable difficulty was experienced in obtaining the desired color and hue when using cadmium sulfide of slightly different grade or when the same was obtained from a different source of supply. Furthermore, the calcined pigments, as prepared prior to this invention, had a high bulk density and a closely packed consistency with a number of large, hard aggregates. Such material is hard to grind to form the ultimate, finely divided pigment. Also, such pigment particles often contain hard cores and gritty particles of different hue than the main mass of pigment and the resulting, finely divided pigment has a speckled or dirty appearance instead of a solid, uniform color.

It is, therefore, an object of this invention to provide a cadmium sulfoselenide pigment which is uniform in consistency and color, and which when incorporated in a glass will produce a colored product having a solid, uniform color of the desired hue.

It is another object of this invention to provide a process for the production of cadmium sulfoselenide pigments having a low bulk density, i. e., a low weight per volume, and which are free from gritty particles.

It is another object of this invention to provide a process for the production of cadmium sulfoselenide pigments, which process is capable of using cadmium sulfide or different grades, or cadmium sulfide obtained from different sources, to produce such pigments which will have a solid, uniform color of the desired hue.

Other objects of the invention will appear hereinafter.

The objects of this invention may be accomplished, in general, by adding to the ingredients for the production of a cadmium sulfoselenide pigment, prior to the calcination thereof, a barium compound taken from the group consisting of barium carbonate and barium peroxide.

In the preferred method of practicing the invention, finely ground (100 mesh or finer) cadmium sulfide, cadmium oxide and selenium, in the desired proportions to obtain a given hue and color, are intimately mixed with a small proportion, preferably from 1% to 4% by weight, of finely ground barium carbonate or barium peroxide, or both, and the mixed powder placed in a clay crucible. The crucible is covered and placed in a muffle furnace and the mixture heated at a temperature between 580° C. and 680° C., until the blue flame which burns at the mouth of the crucible disappears. The crucible is removed from the furnace and the contents thereof are allowed to cool at room temperature with the crucible remaining covered for one-half hour, after which the contents are spread on a cool surface, for example, a steel or iron, or a ceramic surface, at room temperature. After cooling, the pigment is ground to the desired particle size and it is then suitable for use as a red color pigment in glass compositions or the like.

As a result of the incorporation in the batch ingredients of the small amount of barium carbonate or barium peroxide, the pigment is free from hard aggregates and has a low bulk density. After grinding, the pigment is a fine, homogeneous powder, free from gritty particles and particles having hard cores, and it has a solid, uniform color free from particles of differing hue or color.

Somewhat less than 1% of the barium carbonate or peroxide can be incorporated in the batch to improve the resulting pigment to some extent, and considerably larger quantities than 4% can be used to obtain the advantages of the present invention. Care must be taken, however, to keep the barium content of the pigment low if it is to be used in a glass, such as a glass enamel, which is to be fired at an elevated temperature, since glass containing a considerable proportion of barium is inferior under these circumstances.

The function of the barium carbonate or barium peroxide in the composition is not definitely known; however, it has been found that certain other barium compounds when used in the same manner do not have the above-described effect. For example, barium sulfate is not satisfactory for use in accordance with this invention.

Cadmium sulfoselenide pigments are produced by methods involving many variations. In some processes for the production of these pigments, only cadmium sulfide and selenium are used, whereas small amounts of other substances such as cadmium oxide are incorporated with the batch ingredients in other processes. Various processes employ different methods of intimately admixing the ingredients of the batch before calcination, either in a liquid or solid phase. Often extenders, for example, barium sulfate, are added to increase the amount of pigment obtained. In all such processes, however, the cadmium sulfide and selenium, with or without additional agents, are mixed and calcined at temperatures varying from about 550° C. to 700° C. The use of barium carbonate or barium peroxide to improve the resulting product, in accordance with the present invention, may be employed in any process for the production of cadmium sulfoselenide pigments involving the calcination of cadmium sulfide and selenium.

The following example illustrates a preferred method for the production of a red pigment which is particularly suitable for use in glass compositions to produce a red-colored glass. It is to be understood, however, that this example is not to be considered as in any way limiting the scope of this invention.

*Example*

The following batch ingredients, ground to 200-mesh size, are mixed in the dry state by hand stirring in the following proportions:

| | Per cent |
|---|---|
| Cadmium sulfide | 70.6 |
| Cadmium oxide | 8.8 |
| Selenium | 17.7 |
| Barium carbonate [1] | 2.9 |
| | 100.0 |

[1] May be replaced in whole, or in part, with barium peroxide.

After thorough mixing, the mass was placed in a clay crucible which was covered and positioned in a muffle furnace. The temperature of the muffle furnace was adjusted to heat the contents of the crucible to about 650° C. The crucible was carefully observed during the heating. A blue flame burned at the mouth of the crucible for a period of about thirty minutes, after which it nearly extinguished. The crucible was then removed and allowed to cool at room temperature without removing the cover for a period of thirty minutes. The contents of the crucible were then spread for further cooling on a smooth porcelain surface. The mass, after cooling, was free from dense, hard aggregates and had a pure, vivid red color. The pigment, after grinding to 100 mesh, was free from gritty particles and exhibited a solid, homogeneous red color, free from specks of different hue.

Throughout the specification and claims, any reference to parts, proportions or percentages, refers to parts, proportions and percentages by weight unless otherwise specified.

Since it is obvious that many changes and modifications can be made in the above-described details without departing from the nature and spirit of the invention, it is to be understood that the invention is not to be limited to such details except as set forth in the appended claim.

What is claimed is:

In a process for the production of a cadmium sulfoselenide pigment in which batch ingredients containing cadmium sulfide, cadmium oxide and selenium are calcined to produce said pigment, the step which comprises mixing with said batch ingredients, prior to calcination, between 1% and 4% by weight of a barium compound taken from the group consisting of barium carbonate and barium peroxide.

FRANCOIS KERTESZ.

REFERENCES CITED

The following references are of record in the file of this patent:

UNITED STATES PATENTS

| Number | Name | Date |
|---|---|---|
| 2,148,194 | Drucker | Feb. 21, 1939 |
| 2,351,985 | Loeffler | June 20, 1944 |

FOREIGN PATENTS

| Number | Country | Date |
|---|---|---|
| 299,797 | Great Britain | Nov. 1, 1928 |